United States Patent
Kim et al.

(10) Patent No.: US 8,619,870 B2
(45) Date of Patent: *Dec. 31, 2013

(54) DIGITAL BROADCASTING TRANSMISSION/RECEPTION SYSTEM UTILIZING SRS AND TRS CODE TO IMPROVE RECEIVING PERFORMANCE AND SIGNAL PROCESSING METHOD THEREOF

(75) Inventors: Jung-jin Kim, Suwon-si (KR);
Yong-deok Chang, Suwon-si (KR);
Sung-woo Park, Suwon-si (KR);
Eui-jun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 518 days.

This patent is subject to a terminal disclaimer.

(21) Appl. No.: 12/262,594

(22) Filed: Oct. 31, 2008

(65) Prior Publication Data
US 2009/0128712 A1 May 21, 2009

Related U.S. Application Data

(63) Continuation of application No. 11/597,264, filed as application No. PCT/KR2005/001660 on Jun. 3, 2005.

(30) Foreign Application Priority Data

Jun. 5, 2004 (KR) .................................. 2004-41166
Jun. 2, 2005 (KR) .................................. 2005-47133

(51) Int. Cl.
*H04B 1/66* (2006.01)
*H04N 7/12* (2006.01)
*H04N 11/02* (2006.01)
*H04N 11/04* (2006.01)

(52) U.S. Cl.
USPC ............. 375/240.25; 375/240.26; 375/240.27

(58) Field of Classification Search
None
See application file for complete search history.

(56) References Cited

U.S. PATENT DOCUMENTS 4,756,007 A * 7/1988 Qureshi et al. ................ 375/259
6,430,159 B1 * 8/2002 Wan et al. ...................... 370/246
(Continued)

FOREIGN PATENT DOCUMENTS

KR 2001-111667 12/2001

OTHER PUBLICATIONS

Digital Audio-Visual Council, DAVIC 1.3.1 Part 8: 1998, Lower Layer Protocols and Physical Interfaces (pp. 1, 151, 156, 171, and 199).*

(Continued)

*Primary Examiner* — Mehrdad Dastouri
*Assistant Examiner* — Kristin Dobbs
(74) *Attorney, Agent, or Firm* — Sughrue Mion, PLLC

(57) ABSTRACT

A digital broadcasting transmission and/or reception system having an improved reception performance and a signal-processing method thereof. A digital broadcasting transmitter comprises a TRS encoder for to TRS-encode an MPEG-2 transmission stream having null data for inserting an SRS data and a TRS parity at predetermined positions, randomizer to input and randomize data stream from the TRS encoder, a SRS exchanger to replace the null data for inserting the SRS data to the known data, and an encoder for encoding a data streams to which the Known data is inserted. Accordingly, the present invention detects the known data from a signal received from a reception side and uses the detected known data for synchronization and equalization and further uses the TRS parity for correcting error of the received signal, so that the digital broadcasting reception performance can be improved at poor multipath channels.

16 Claims, 8 Drawing Sheets

(56) References Cited

U.S. PATENT DOCUMENTS

| | | | |
|---|---|---|---|
| 6,810,084 B1* | 10/2004 | Jun et al. | 375/240.28 |
| 7,068,326 B2* | 6/2006 | Choi et al. | 348/614 |
| 7,080,293 B2* | 7/2006 | Kim et al. | 714/701 |
| 2001/0034867 A1 | 10/2001 | Jaffe et al. | |
| 2003/0099303 A1* | 5/2003 | Birru et al. | 375/265 |
| 2006/0159193 A1* | 7/2006 | Mattsson et al. | 375/265 |
| 2006/0269012 A1* | 11/2006 | Kim et al. | 375/270 |

OTHER PUBLICATIONS

PCT Preliminary Report on Patentability dated Dec. 21, 2006 issued in PCT/KR 2005/001661.

* cited by examiner

KNOWN SYMBOL LOCATION DETECTOR / OUTPUT

DIGITAL BROADCASTING TRANSMISSION/RECEPTION SYSTEM UTILIZING SRS AND TRS CODE TO IMPROVE RECEIVING PERFORMANCE AND SIGNAL PROCESSING METHOD THEREOF

This application is a continuation of prior application Ser. No. 11/597,264, filed Nov. 20, 2006, in the U.S. Patent and Trademark Office, now pending, which claims priority from Korean Patent Application Nos. 2004-41166 and 2005-47133, filed on Jun. 5, 2004 and Jun. 2, 2005, respectively, in the Korean Intellectual Property Office, and International application PCT/KR2005/001660, filed on Jun. 3, 2005, the disclosures of which are incorporated herein in their entirety by reference.

TECHNICAL FIELD

The present invention relates to a digital broadcasting transmission/reception system, and more specifically, to a digital broadcasting transmission/reception system transmitting predefined known data with a supplementary reference signal (SRS) added to an Moving Picture Experts Group-2 transport stream (MPEG-2 TS) to improve performance of a reception system and utilizing a transversal Reed Solomon (TRS) code to reinforce error-correcting capacity and a signal processing method thereof.

BACKGROUND ART

The Advanced Television Systems Committee Vestigial Sideband (ATSC VSB) method, a U.S-oriented terrestrial waves digital broadcasting system, is a single carrier method and uses a field sync by 312 segment unit. Accordingly, reception performance is not good at poor channels, especially at a doppler fading channel.

FIG. 1 is a block diagram of a transmitter/receiver of a general U.S-oriented terrestrial waves digital broadcasting system according to the ATSC digital television (DTV) standards.

The digital broadcasting transmitter of FIG. 1 has a randomizer (110) for randomizing an MPEG-2 TS, an Reed-Solomon (RS) encoder (120) of a concatenated coder form for adding a parity byte to the TS to correct errors generated by channel characteristics on transmission, an interleaver (130) for interleaving the RS encoded data in a certain pattern, and a 2/3 rate Trellis encoder (140) for performing 2/3 rate Trellis encoding and 8 level symbol mapping of the interleaved data, so that error-correcting encoding of the MPEG-2 TS is performed.

Further, the digital broadcasting transmitter has a multiplexer (150) for inserting a field sync and segment sync in the error-correcting encoded data as a data format of FIG. 2, and a modulator (160) for adding a certain DigiCipher (DC) value to e data symbol inserted with the segment sync and field sync, inserting a pilot tone therein, performing pulse-shaping and vestigial sideband (VSB) modulation, up-converting them into a signal of RF, channel band and transmitting them.

Accordingly, the digital broadcasting transmitter randomizes the MPEG-2 TS through the randomizer (110), the randomized data are outer-coded through the RS encoder (120) which is an outer coder, and the outer-coded data are dispersed through the interleaver (130). In addition, the interleaved data are inner-coded by 12 symbol unit through the Trellis encoder (140) and the inner-coded data are mapped with a 8 level symbol, inserted with the field sync and segment sync, inserted with the pilot tone, VSB-modulated, up-converted into a RF signal and transmitted.

Meanwhile, the digital broadcasting receiver of FIG. 1 has a tuner (not shown) for down-converting the RF signal received through a channel into a basic signal, a demodulator (210) for performing sync detection and demodulation of the down-converted basic signal, an equalizer (220) for compensating channel distortion which is generated by multipath in the demodulated signal, a Viterbi decoder (230) for correcting errors in the equalized signal and decoding the signal in symbol data, a deinterleaver (240) for rearranging the data dispersed by the interleaver (130) of the digital broadcasting transmitter, an RS decoder (250) for correcting errors and a derandomizer (260) for derandomizing the data corrected through the RS decoder (250) and outputting the MPEG-2 TS.

Accordingly, the digital broadcasting receiver of FIG. 1 down-converts the RF signal into baseband, demodulates and equalizes the down-converted signal, performs channel decoding, and restores the original signal in a reverse order of the digital broadcasting transmitter.

FIG. 2 shows a vestigial sideband (VSB) data frame of the U.S-oriented digital broadcasting (8-VSB) system which is inserted with the segment sync and field sync. As shown in FIG. 2, one frame consists of two fields and one field consists of one field sync segment which is the first segment and 312 data segments. Further, one segment of VSB data frame corresponds to one MPEG-2 packet and consists of a segment sync of four symbols and 828 data symbols.

In FIG. 2, the segment sync and field sync are used for synchronization and equalization in the digital broadcasting receiver. That is, the segment sync and field sync are already known data between the digital broadcasting transmitter and receiver and are used as a reference signal on equalization of the receiver.

The VSB method of the U.S-oriented terrestrial waves digital broadcasting system as shown in FIG. 1 is a single carrier method and is weak in a multipath fading channel environment. Accordingly, performance of a receiver depends on performance of an equalizer to remove multipath.

However, according to the conventional transmission frame as shown in FIG. 2, as a field sync which is a reference signal of the equalizer appears every 313 segment, the frequency of the field sync is low compared with a signal of one frame so that equalization performance decreases.

In other words, it is not easy to estimate a channel, remove multipath, and equalize a received signal using the conventional equalizer and the above mentioned known data of small quantity. Accordingly, the conventional digital broadcasting receiver has low reception performance in a poor channel environment, especially, in the Doppler fading channel environment.

Additionally, the VSB method of the U.S-oriented terrestrial waves digital television system of FIG. 1 is a single carrier system and has the low capacity to remove multipath in the Doppler multipath fading channel. However, if the known sequence such as a field sync is used a lot, the channel is easily estimated and the equalizer easily compensated the signal distorted by multipath using the known sequence.

However, as shown in the VSB data frame of the U.S-oriented terrestrial waves digital television system of FIG. 2, a field sync which is known data appears every 313 segment. This is so small quantity, so that the capacity to remove the multipath by using this decreases. Especially, the capacity to remove multipath in the Doppler multipath fading channels is low.

DISCLOSURE OF INVENTION

Technical Problem

An aspect of the present invention is to provide a digital broadcasting transmitter/receiver which insert null data without information at certain intervals in an MPEG-2 packet to improve reception performance of the U.S-oriented terrestrial waves digital television system of the VSB method, transmit SRS and add TRS code so that the receiver detects and uses the SRS, and more efficiently corrects errors by the TRS code to improve reception performance and a signal processing method thereof.

Technical Solution

To achieve the aspect of the present invention, a digital broadcasting transmitter includes a TRS encoder for receiving an MPEG-2 TS and performing TRS encoding of the MPEG-2 TS, the MPEG-2 TS including null data to insert SRS data and TRS parity respectively at a certain location, a randomizer for randomizing the data output from the TRS encoder, an SRS replacing part for replacing the null data to insert SRS data of the randomized data with the SRS data, an RS encoder for RS-encoding the data output from the SRS replacing part and adding an RS parity, an interleaver for interleaving the data output from the RS encoder, a Trellis encoder for Trellis-encoding the data output from the interleaver and a modulator for modulating the data output from the Trellis encoder, performing RF converting and transmitting the resultant data.

Preferably, the null data to insert the SRS data are constructed to a certain amount at the certain location of each segment.

More preferably, the data stream has the information on the insertion location and the amount of the null data, and the information is inserted prior to the location where the null data are inserted.

Further, the digital broadcasting transmitter further includes a control signal generator for generating a control signal to control the SRS replacing part to insert the SRS data at the location according to the information.

Moreover, the Trellis encoder has a memory element for Trellis encoding operation, initializes the memory element at the location where the SRS data are inserted and performs Trellis encoding.

Further, the digital broadcasting transmitter further includes a packet buffer for receiving and storing the data which are output from the RS encoder and which correspond to the location where the memory element of the Trellis encoder is initialized.

More preferably, the packet buffer receives the data altered according to the initialization of the memory element from the Trellis encoder.

Further, the digital broadcasting transmitter further includes a parity replacing part for RS-encoding the altered data, which are input from the packet buffer, according to the initialization of the memory element, generating and outputting an altered RS parity to the Trellis encoder, so that the RS parity added by the RS encoder is replaced by the altered RS parity.

Preferably, the TRS encoder includes a buffer for storing data input in the row direction and outputting the data in the column direction, an encoder for TRS encoding the data output from the buffer and adding the TRS parity in the column direction, and a memory for receiving and storing the data added with the TRS parity and outputting the data in the row direction.

Furthermore, a signal processing method for a digital broadcasting transmitter according to the present invention includes a TRS encoding step of receiving an MPEG-2 TS and performing TRS encoding of the MPEG-2 TS, the MPEG-2 TS including null data to insert SRS data and TRS parity respectively at a certain location, a randomizing step of randomizing the data output from the TRS encoding step, an SRS replacing step of replacing the null data of the randomized data to insert SRS data with the SRS data, an RS encoding step of RS-encoding the data output from the SRS replacing step and adding RS parity, a interleaving step of interleaving the data output from the RS encoding step, a Trellis encoding step of Trellis-encoding the data output from the interleaving step and a step of modulating the data output from the Trellis encoding step, performing RF converting and transmitting the resultant data.

A digital broadcasting receiver corresponding to the digital broadcasting transmitter according to the present invention includes a demodulator for receiving a signal from the digital broadcasting transmitter and demodulating the received signal, the signal being inserted with SRS and TRS parity at a certain location, a known data output part for detecting the location of the SRS from the demodulated signal and outputting the SRS, an equalizer for equalizing the demodulated signal, a Viterbi decoder for error-correcting and decoding the equalized signal using the output SRS, a deinterleaver for deinterleaving the data output from the Viterbi decoder, a derandomizer for derandomizing die data output from the deinterleaver, and a TRS decoder for TRS-decoding the data output from the derandomizer using the TRS parity.

Preferably, the known data output part includes a known data detector for detecting the information on the certain location and an amount of the inserted SRS from the received signal, a segment flag generator for generating a data frame including at least one segment which indicates the location with a predetermined flag, a Trellis interleaver for encoding the data frame as encoded in the digital broadcasting transmitter, and a known data extractor for extracting and outputting the SRS at the location marked with the flag of the encoded data frame.

Further, the TRS decoder includes a buffer for storing data input in the row direction and outputting the data in the column direction, a decoder for TRS-decoding the data output from the buffer using the TRS parity, and a memory for receiving and storing the TRS-decoded data and outputting the data in the row direction.

In addition, a signal processing method for a digital broadcasting receiver according to the present invention includes a step of receiving a signal from the digital broadcasting transmitter and demodulating the received signal, the signal being inserted with SRS and TRS parity at a certain location, a step of detecting the location of the SRS from the demodulated signal and outputting the SRS, a step of equalizing the demodulated signal, a step of error-correcting and decoding the equalized signal using the output SRS, a step of deinterleaving the decoded data, a step of derandomizing the deinterleaved data and a step of TRS-decoding the derandomized data using the TRS parity.

Advantageous Effects

According to the present invention, to improve reception performance of the ATSC VSB system of the U.S-oriented terrestrial waves digital television system, an MPEG-2 packet is inserted with null data at certain intervals, transmitted in SRS, and added with TRS code so that reception performance is improved and reception range can be extended due to low required Signal to Noise Ratio (SNR). Additionally, there is compatibility with the conventional system.

BEST MODE FOR CARRYING OUT THE INVENTION

Hereinafter, the present invention is described in detail referring to accompanying drawings.

Figure 3:
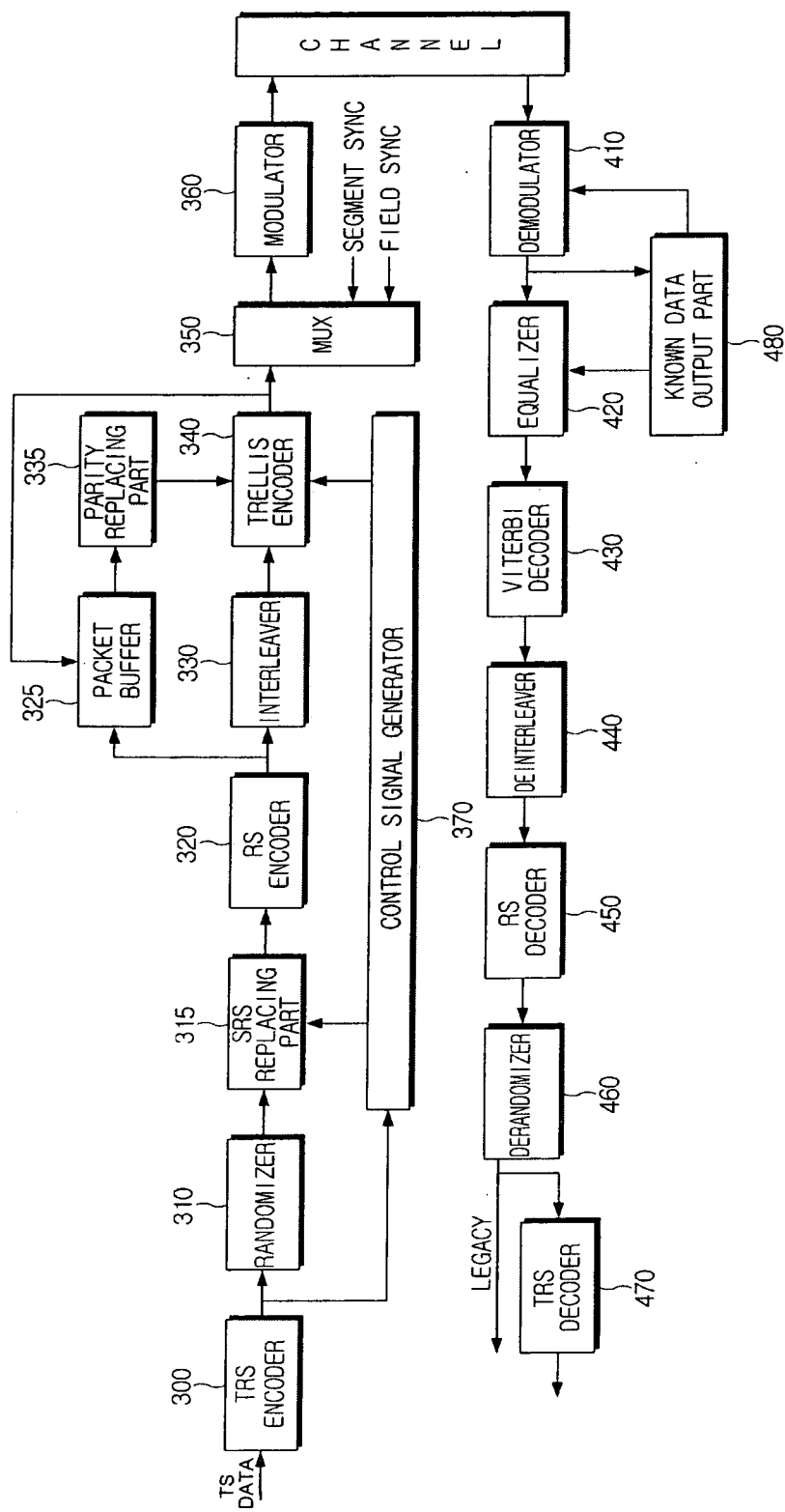
FIG. 3 is a block diagram of a digital broadcasting transmitter/receiver according to the present invention.

FIG. 3 is a block diagram of a digital broadcasting transmitter/receiver according to the present invention.

In FIG. 3, a TS, which is input to the digital broadcasting transmitter, is inserted with null data to generate a SRS, which is predefined known data between the transmitter and the receiver, and a TRS code parity. This will be described in detail later.

Figure 1:
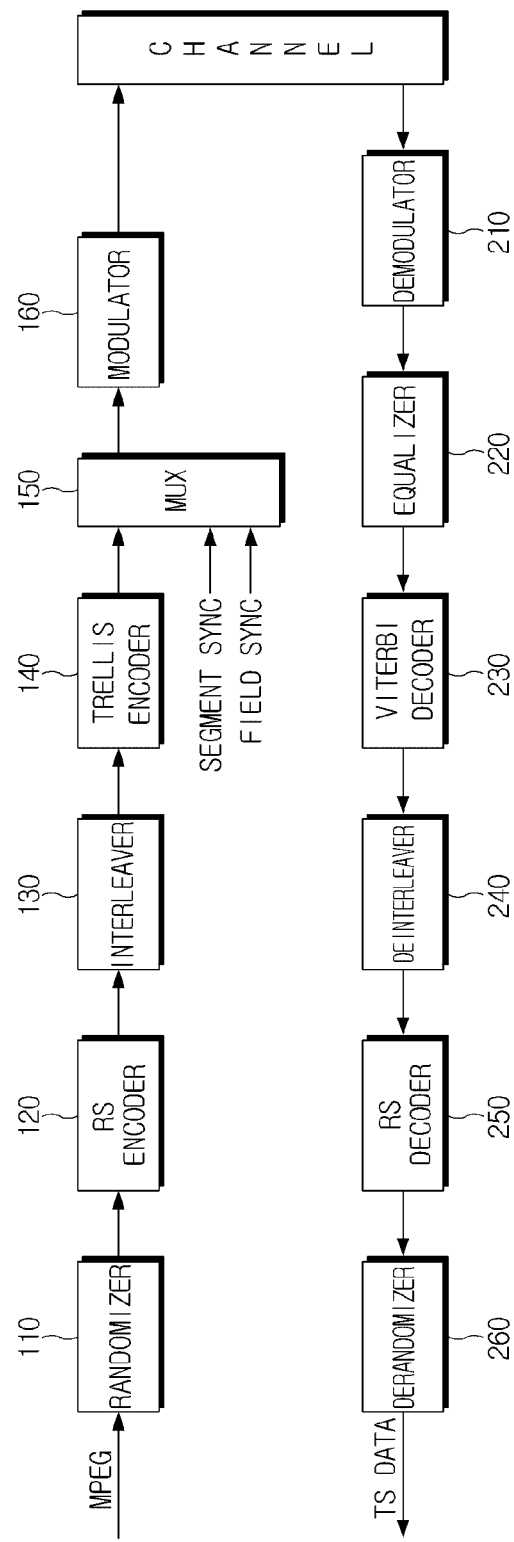
FIG. 1 is a block diagram of a general digital broadcasting (ATSC VSB) transmitter/receiver.
Figure 2:
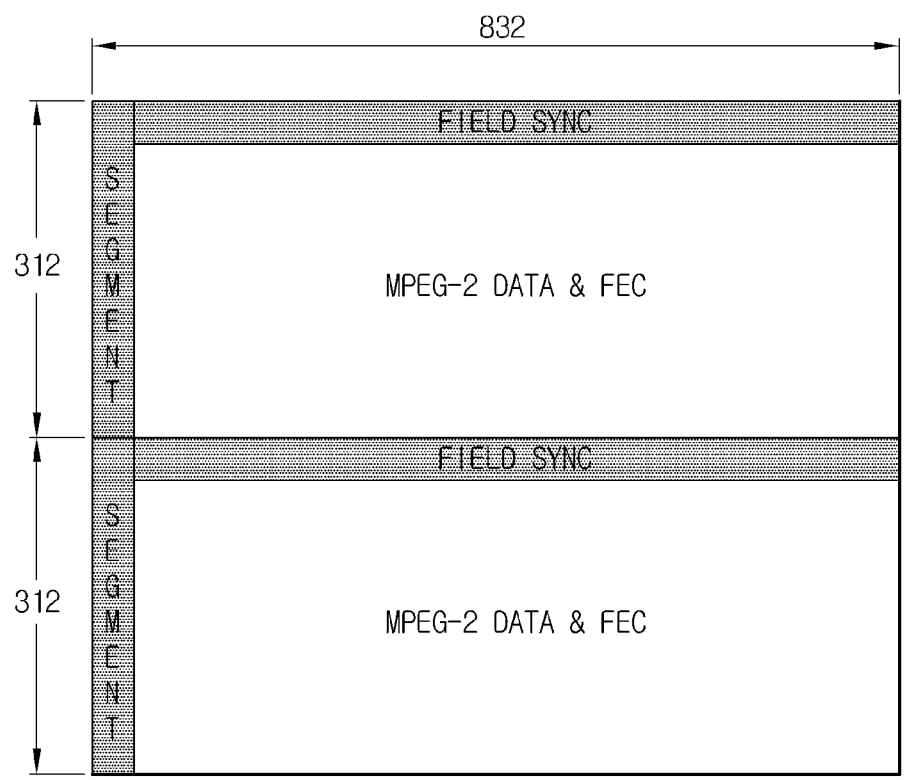
FIG. 2 is a view showing a frame structure of ATSC VSB data.

The digital broadcasting transmitter includes a TRS encoder (300) for adding RS parity in the column direction, a randomizer (310) for randomizing the data, a SRS replacing part (315) for replacing null data of the randomized data with a SRS, an RS encoder (320) for adding a RS parity in the row direction, a packet buffer (325) for storing the RS encoded SRS in memory initialization of a Trellis encoder (340) and replacing it with an altered value according to initialization, a parity replacing part (335) for RS encoding again using the altered value, generating a parity, and inputting the generated parity to the Trellis encoder (340), an interleaver (330) for interleaving the RS encoded data, the Trellis encoder (340) for converting the interleaved data into symbol and performing 2/3 rate Trellis encoding and symbol mapping, a multiplexer (350) for inserting a field sync and segment sync as a data format of FIG. 2, and a modulator (360) for inserting a pilot, performing VSB modulation, RF converting and transmitting the data. Additionally, the digital broadcasting transmitter further includes a control signal generator (370) for generating an operation control signal to process the null data according to the location and quantity of the null data.

Figure 4:
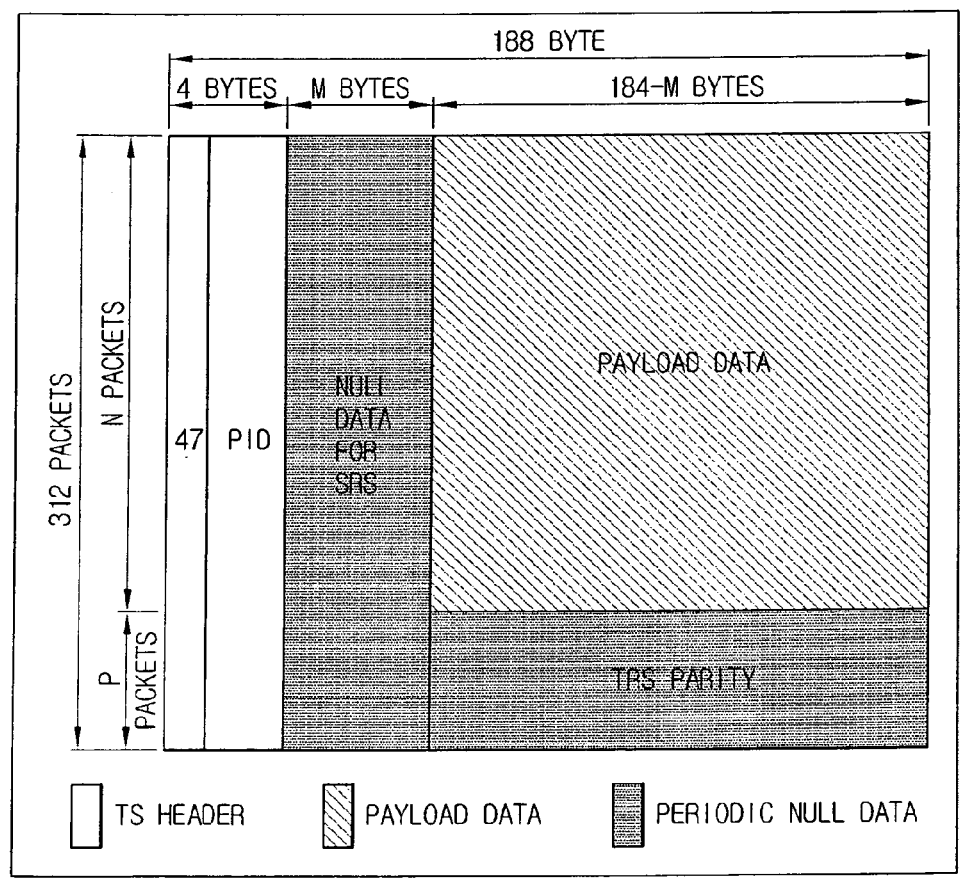
FIG. 4 is a view showing a format of TRS input data added with null data according to the present invention.

FIG. 4 shows a data format of an MPEG-2 TS input to a digital broadcasting transmitter according to the present invention.

Referring to FIG. 4, one field of the MPEG-2 TS according to the present invention consists of 312 segments with a header having a sync of the first byte and packet identity (PID) of the next three bytes, 'm' bytes after the header consists of null data to insert a SRS, and a part after the null data consists of payload data. However, certain segments, which are the part for the payload data, at the bottom of a field consists of null data to insert TRS.

The TRS encoder (300) performs RS encoding of the MPEG-2 TS input to the digital broadcasting transmitter in the column direction and adds RS parity, which is generated in the column direction, at the location of null data inserted in the input TS to generate TRS parity.

Figure 5:
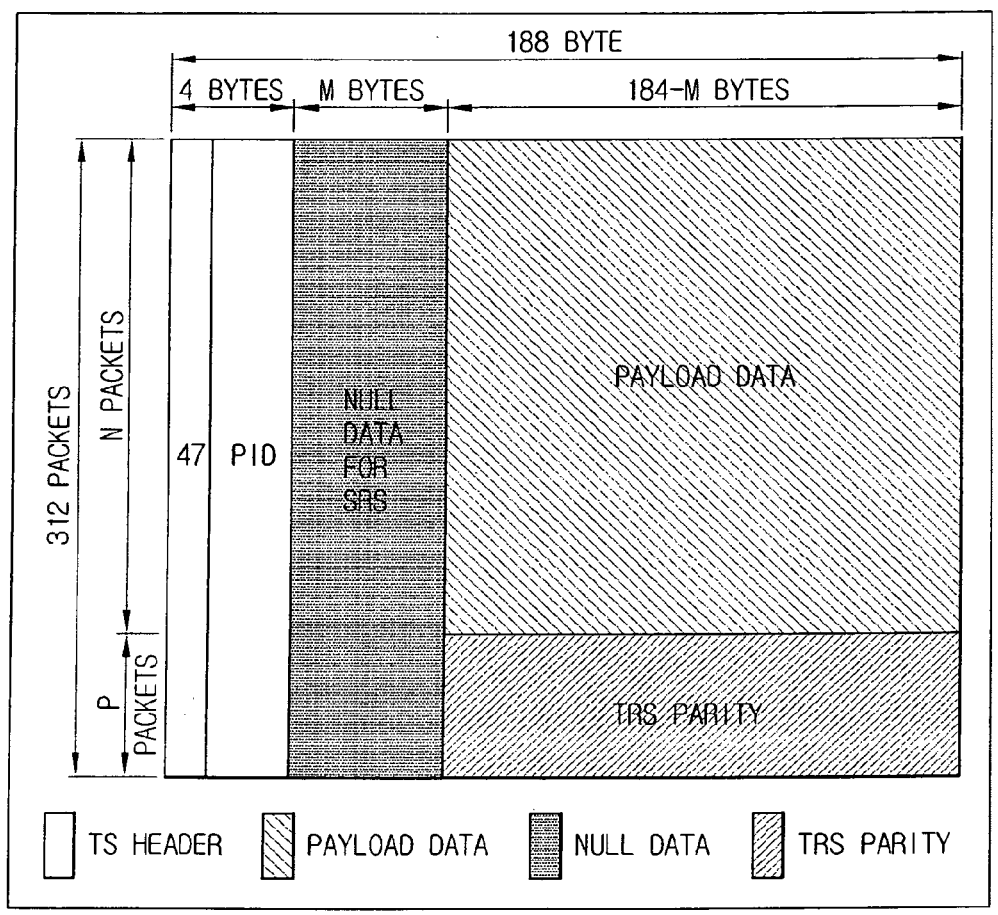
FIG. 5 is a view showing a format of the data output from a TRS encoder.

FIG. 5 shows a format of the data output from the TRS encoder (300). Referring to FIG. 5, TRS parity generated by the TRS encoder (300) is added to the location where the null data for TRS are inserted in the data format of FIG. 4.

The randomizer (310) randomizes the input MPEG-2 TS data to increase application of the allocated channel space.

The SRS replacing part (315) generates particular sequence data of a certain pattern which are predefined between the transmitter and the receiver as a SRS, replaces the randomized data at the location of the null data for SRS in the randomized data by inserting the particular sequence data therein. The pattern of the SRS is different from that of transmitted/received payload data and the SRS is easily detected from the payload data to transmit so that the SRS is utilized for synchronization and equalization of the receiver.

The RS encoder (320) RS encodes the packet data to correct errors by a channel and adds parity of certain bytes.

The interleaver (330) interleaves the parity-added packet output from the RS encoder (320) in a certain pattern.

The Trellis encoder (340) converts the data output from the interleaver (330) into symbols and performs symbol mapping through 2/3 rate Trellis encoding. The Trellis encoder (340) initializes a value which is temporarily stored in its own memory element at the beginning location of the SRS and Trellis-encodes the known data.

The packet buffer (325) outputs and temporarily stores the data from the beginning location of the data corresponding to the location of the SRS from the packet output from the RS encoder (320). Then, when the data are altered according to the initialization of the Trellis encoder (340), the packet buffer (325) receives a certain amount of the altered data from the Trellis encoder (340), replaces the previous data which are temporarily stored, by temporarily storing the altered data, and inputs the altered data to the parity replacing part (335) to regenerate RS parity.

The parity replacing part (335) receives the data altered according to the memory initialization, regenerates an RS parity according to the altered data, and inputs it to the Trellis encoder (340) so that the previous parity is replaced with the regenerated parity.

Figure 6:
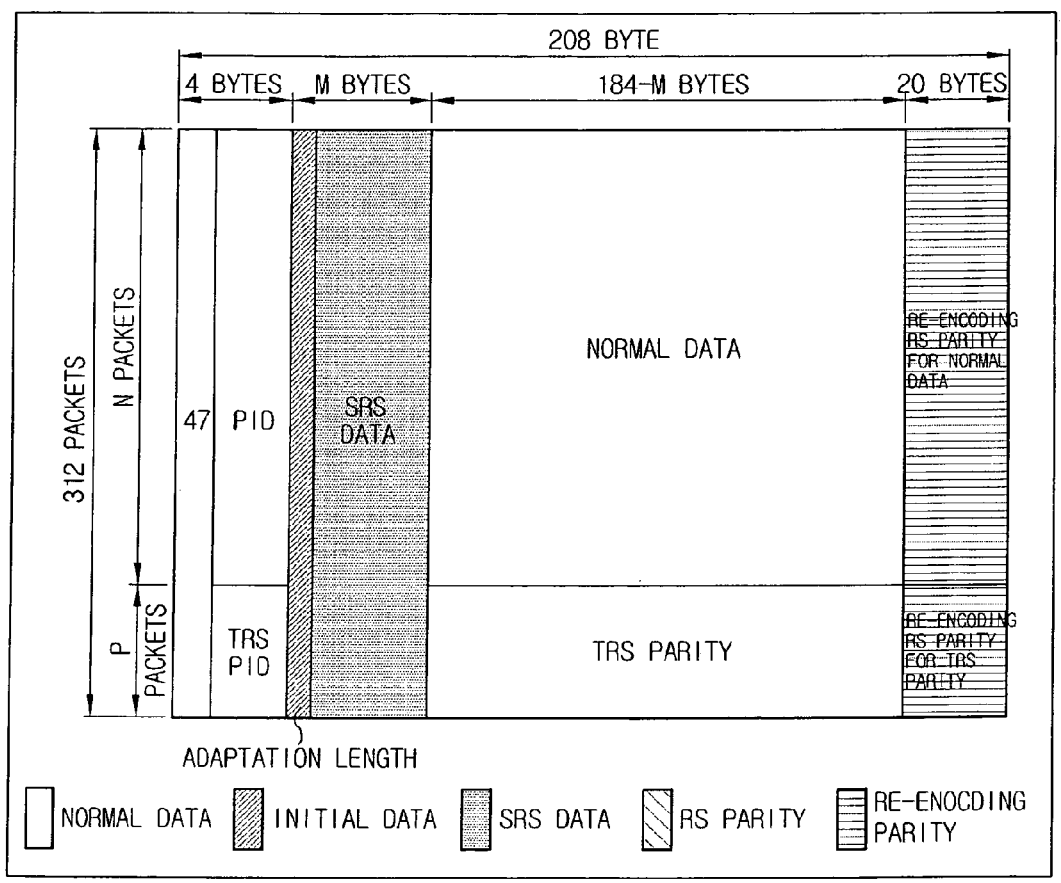
FIG. 6 is a view showing a format of data output from a parity replacing part.

FIG. 6 shows a format of the data output from the parity replacing part (335). Referring to FIG. 6, the data altered according to the initialization of the Trellis encoder (340) of the SRS data which have been replaced by the SRS replacing part (315) are RS-encoded so that a new RS parity is generated and replaces the previous RS parity.

Therefore, the packet data output from the Trellis encoder (340) to the multiplexer (350) has a format of the data, which is altered according to the memory element initialization of the Trellis encoder (340), and added with the RS parity according to subsequent RS encoding.

Figure 7:
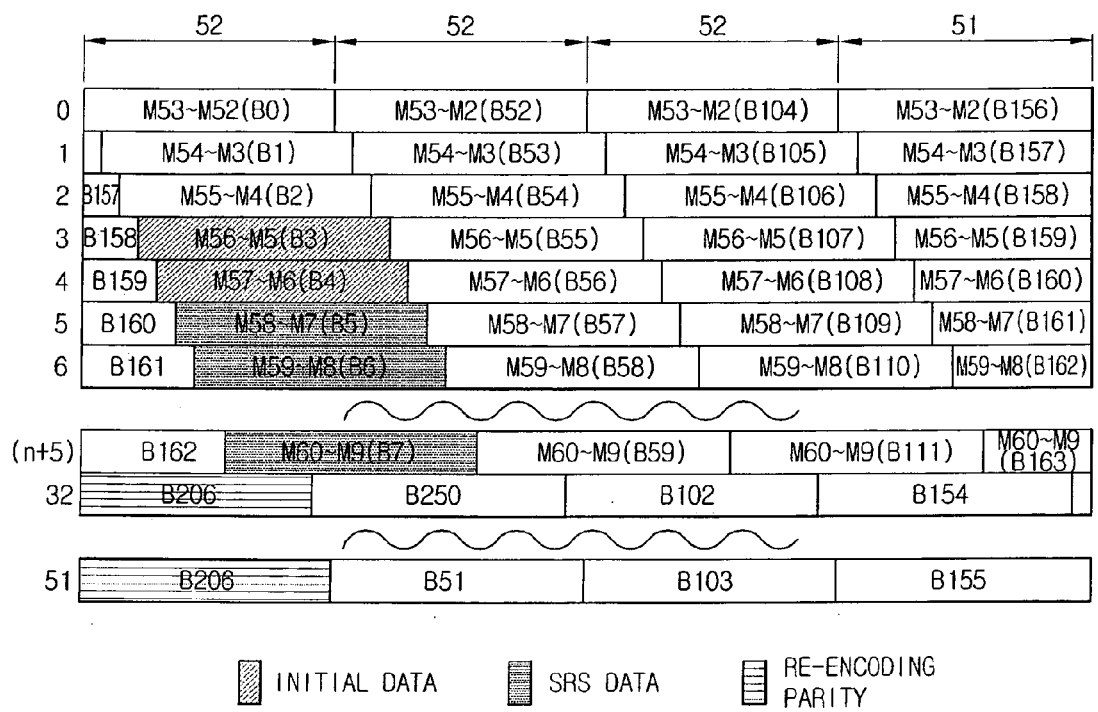
FIG. 7 is a view showing a format of data output from a data interleaver.

FIG. 7 shows a format of the data output from the interleaver (330), and indicates the location of data for the SRS and the location of the RS parity.

Referring to FIG. 7, the corresponding RS parity is located after the data for SRS. Accordingly, when the Trellis encoder (340) sequentially encodes the data input from the interleaver (330) and finishes data encoding for SRS, the parity for this is replaced with the altered parity output from the parity replacing part (335) and encoded so that encoding is sequentially performed.

As shown in the data format which is converted into symbols by the Trellis encoder (340) of FIG. 2, the multiplexer (350) inserts a segment sync in segment unit and a field sync in field unit, adds a certain DC value to a data signal of a certain level and inserts a pilot signal in edge part of low frequency band on frequency spectrum.

The modulator (360) performs pulse shaping of the signal which is inserted with the pilot signal, loads it on intermediate frequency carrier wave and modulates amplitude for VSB modulation. Then, the modulated signal is converted into RF, amplified and transmitted through a channel allocated in a certain band.

The control signal generator (370) receives the null data-added TS from the randomizer (310), detects the information from the TS regarding the location where the null data are added, generates a control signal to recognize the beginning location and ending location, and inputs the control signal to the SRS replacing part (315), the interleaver (320) and the Trellis encoder (340).

Meanwhile, the digital broadcasting receiver according to the present invention operates in a reverse order of the transmitter and includes a demodulator (410) for lowering the RF signal to baseband and demodulating the RF signal, an equalizer (420) for deleting inter-symbol interference, a Viterbi decoder (430) for error-correcting and decoding, a deinterleaver (440), an RS decoder (450), a derandomizer (460), a TRS decoder (470) and a known data output part (480) for detecting and outputting the location of the known data.

The demodulator (410) detects synchronization according to the pilot signal and sync inserted in the baseband signal of the received signal and performs demodulation. In addition, the equalizer (420) compensates multipath channel distortion of the demodulated signal and removes the received inter-symbol interference.

The Viterbi decoder (430) corrects errors, decodes the error-corrected symbol and outputs the symbol data. The decoded data rearranges the dispersed data through the deinterleaver (440).

The deinterleaved data are error-corrected through the RS decoder (450) and the error-corrected data are derandomized through the derandomizer (460).

The TRS decoder (470) corrects errors using the RS parity which is added in the column direction so that the data of MPEG-2 TS are restored.

Figure 8:
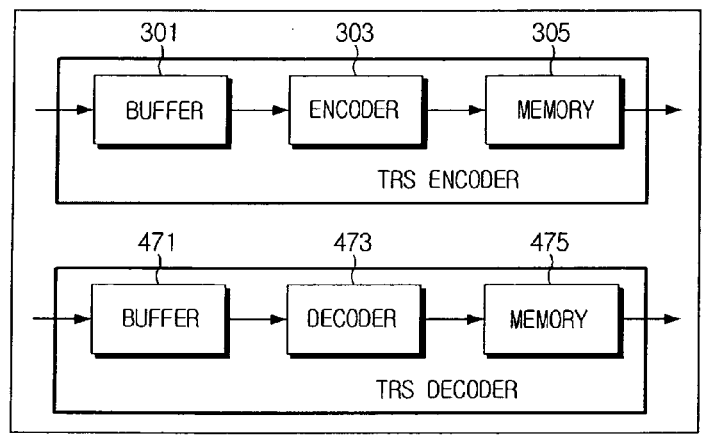
FIG. 8 is a detailed block diagram of a TRS encoder and decoder.

FIG. 8 shows a detailed block diagram of the TRS encoder (300) and TRS decoder (470) according to the present invention.

The TRS encoder (300) includes a buffer (301) for storing the data input in the row direction and outputting the data in the column direction, an encoder (303) for TRS-encoding the data input in the column direction from the buffer and adding parity in the column direction, and a memory (305) for receiving and storing the parity-added data in the column direction and outputting the data in the row direction.

Additionally, the TRS decoder (470) has a buffer (471) for storing the data input in the row direction and outputting the data in the column direction, a decoder (473) for error-correcting the data input in the column direction from the buffer (471) using the RS parity which is added in the column direction, and a memory (475) for storing the error-corrected data and outputting the data in the row direction.

Meanwhile, the known data output part (480) detects the information on the location of the known data from the demodulated data, generates segment frame, performs encoding and outputs the generated known data, and provides them for synchronization detection of the demodulator (410) and channel distortion compensation of the equalizer (420).

Figure 9:
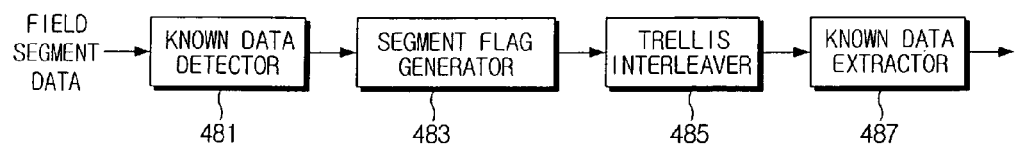
FIG. 9 is a block diagram of a known data output part.

FIG. 9 shows a detailed block diagram of the known data output part (480).

Referring to FIG. 9, the known data output part (480) includes a known data detector (481), a segment flag generator (483), a Trellis interleaver (485), and a known data extractor (487).

The known data detector (481) detects the quantity information of null packet inserted in the reserved part of field sync data segment section of the demodulated data and acquires the information on the location and length of the known data.

According to the detected information on the quantity of the null packet, that is, according to the information on the location and length of the known data, the segment flag generator (483) marks with a predetermined flag of length corresponding to the number of data symbols at the corresponding location and generates at least one segment and an MPEG-2 transmission frame including the segment.

The Trellis interleaver (485) encodes the transmission frame generated in the segment flag generator (483) as the encoding of the transmitter, and detects the known data according to the flag.

Therefore, the known data extractor (487) acquires the information on the location which is detected by the flag of the transmission frames which are encoded and output from the Trellis interleaver (485), and extracts and outputs the known data at the corresponding location.

According to the present invention, in order to improve reception performance of VSB method of the U.S-oriented terrestrial waves digital television system, a null packet without information are inserted at certain intervals in an MPEG-2 packet known symbol data are transmitted from the transmitter using them, and a TRS code is added, and the receiver detects and uses the known symbol data, and re-performs error-correcting using the TRS codes so that reception performance can be improved at poor multipath channels.

Moreover, SNR to satisfy TOV can be lowered using TRS codes. This proposed method guarantees compatibility with the existing receivers suggested by ATSC, and system performance can be improved without performance degradation of the existing receivers.

Accordingly, reception performance of ATSC VSB method of the U.S-oriented terrestrial waves digital television system can be enhanced according to the present invention.

Accordingly, reception performance of ATSC VSB method of the U.S-oriented terrestrial waves digital television system can be enhanced according to the present invention.

The invention claimed is:
1. A digital broadcast receiver, comprising:
a demodulator to demodulate a transport stream received from a digital broadcast transmitter, the transport stream comprising data, a parity which is generated by encoding the data in column direction, and known data which is previously known between the digital broadcast transmitter and the digital broadcast receiver;
an equalizer to equalize the demodulated transport stream using the known data; and
a decoder to perform decoding on the equalized transport stream,
wherein the known data is different from payload data, a field sync and a segment sync,
wherein the transport stream has been processed by initializing the internal memories of a Trellis encoder at a beginning location of the known data input to the Trellis encoder before the transport stream is received at the digital broadcast receiver, and wherein the transport stream has been further processed by adding a Reed Solomon (RS) parity thereto, and regenerating an RS parity according to the initialization of the internal memories so that the added RS parity is replaced with the regenerated RS parity.

2. The digital broadcast receiver of claim 1, wherein the known data are inserted by the digital broadcast transmitter at a predetermined location of the transport stream according to a control signal for controlling insertion operation of the known data.

3. The digital broadcast receiver of claim 1, wherein the decoder corrects errors using a Reed-Solomon (RS) parity which is added to the transport stream in a column direction.

4. The digital broadcast receiver of claim 1, wherein the decoder comprises:
  a buffer to store data input in a row direction, and output the stored data in a column direction;
  a decoder to correct errors on the data output in a column direction using a Reed Solomon (RS) parity added in a column direction; and
  a memory to store the corrected data, and output the stored data in a row direction.

5. The digital broadcast receiver of claim 1, further comprising a known data output unit to detect information regarding the known data from the transport stream demodulated by the demodulator, and detect the known data according to the detected information.

6. The digital broadcast receiver of claim 1, further comprising a known data output unit which comprises:
  a known data detector to detect information regarding known data from the transport stream demodulated by the demodulator;
  a segment flag generator to generate a segment by indicating an identification according to the detected information, and generate a transport frame having the generated segment;
  a Trellis interleaver to encode the generated transport frame to correspond to the digital broadcast transmitter; and
  a known data extractor to extract the known data from the transport frame output from the Trellis interleaver according to the identification.

7. A method for processing a stream of a digital broadcast receiver, the method comprising:
  receiving a transport stream from a digital broadcast transmitter, the transport stream comprising data, a parity which is generated by encoding the data in column direction, and known data which is previously known between the digital broadcast transmitter and the digital broadcast receiver;
  equalizing the demodulated transport stream using the known data; and
  performing decoding on the equalized transport stream,
  wherein the known data is different from payload data, a field sync and a segment sync,
  wherein the transport stream has been processed by initializing the internal memories of a Trellis encoder at a beginning location of the known data input to the Trellis encoder before the transport stream is received at the digital broadcast receiver, and
  wherein the transport stream has been further processed by adding a Reed Solomon (RS) parity thereto, and regenerating an RS parity according to the initialization of the internal memories so that the added RS parity is replaced with the regenerated RS parity.

8. The method of claim 7, wherein the known data are inserted by the digital broadcast transmitter at a predetermined location of the transport stream according to a control signal for controlling insertion operation of the known data.

9. The method of claim 7, wherein the performing decoding comprises:
  correcting errors using a Reed-Solomon (RS) parity which is added to the transport stream in a column direction.

10. The method of claim 7, wherein the performing decoding comprises:
  buffering data input in a row direction, and outputting the stored data in a column direction;
  correcting errors on the data output in a column direction using a Reed Solomon (RS) parity added in a column direction; and
  outputting the corrected data in a row direction.

11. The method of claim 7, further comprising:
  detecting information regarding the known data from the demodulated transport stream, and detecting the known data according to the detected information.

12. The method of claim 7, further comprising:
  detecting information regarding the known data from the demodulated transport stream;
  generating a segment by indicating an identification according to the detected information, and generating a transport frame having the generated segment;
  encoding the generated transport frame to correspond to a digital broadcast transmitter; and
  extracting known data from the encoded transport frame according to the identification.

13. A digital broadcast receiver comprising:
  a demodulator to demodulate a transport stream received from a digital broadcast transmitter, the transport stream comprising a sync signal and known data which is known previously between the digital broadcast transmitter and the digital broadcast receiver;
  an equalizer to equalize the demodulated transport stream using the known data; and
  a decoder to perform decoding on the equalized transport stream,
  wherein the transport stream has been processed by adding a Reed Solomon (RS) parity thereto, and initializing internal memories of a Trellis encoder at a beginning of the known data input to the Trellis encoder, and
  wherein the transport stream has been further processed by regenerating an RS parity according to the initialization so that the added RS parity is replaced with the regenerated RS parity.

14. The digital broadcast receiver of claim 1, wherein the known data is interleaved and trellis encoded in the digital broadcast transmitter.

15. A method for processing a stream of a digital broadcast receiver, the method comprising:
  demodulating a transport stream received from a digital broadcast transmitter, the transport stream comprising a sync signal and known data which is known previously between the digital broadcast transmitter and the digital broadcast receiver;
  equalizing the demodulated transport stream using the known data; and
  decoding the equalized transport stream,
  wherein the transport stream has been processed by adding a Reed Solomon (RS) parity thereto, and initializing internal memories of a Trellis encoder at a beginning of the known data input to the Trellis encoder, and wherein the transport stream has been further processed by regenerating an RS parity according to the initialization so that the added RS parity is replaced with the regenerated RS parity.

16. The method of claim 15, wherein the known data is interleaved and trellis encoded in the digital broadcast transmitter.

* * * * *